United States Patent
Chui et al.

(10) Patent No.: US 8,279,727 B1
(45) Date of Patent: Oct. 2, 2012

(54) SYSTEMS AND METHODS FOR REDUCING SPINDLE RECTIFICATION SWITCHING

(75) Inventors: Siew Yong Chui, Singapore (SG); Rudy Kurniawan, Singapore (SG); Cheng Yong Teoh, Singapore (SG)

(73) Assignee: Marvell International Ltd. (BM)

( * ) Notice: Subject to any disclaimer, the term of this patent is extended or adjusted under 35 U.S.C. 154(b) by 745 days.

(21) Appl. No.: 12/350,732

(22) Filed: Jan. 8, 2009

Related U.S. Application Data (60) Provisional application No. 61/019,920, filed on Jan. 9, 2008.

(51) Int. Cl.
*G11B 7/00* (2006.01)
*G11B 5/09* (2006.01)
*G11B 15/18* (2006.01)

(52) U.S. Cl. ............... 369/47.43; 369/47.28; 369/47.19; 369/47.23; 369/47.34; 369/47.45; 369/53.3; 369/53.34; 369/124.04; 369/124.14; 360/32; 360/46; 360/51

(58) Field of Classification Search ............ 369/48, 369/50, 54, 58, 59, 60, 124, 47.43, 47.28, 369/47.19, 47.23, 47.34, 47.45, 53.3, 53.34, 369/124.04, 124.14; 360/32, 46, 51
See application file for complete search history.

(56) References Cited

U.S. PATENT DOCUMENTS

| | | | | |
|---|---|---|---|---|
| 5,956,307 A | * | 9/1999 | Koudo et al. | 369/47.43 |
| 6,069,854 A | * | 5/2000 | Koudo et al. | 369/47.19 |
| 6,215,266 B1 | * | 4/2001 | Goh et al. | 318/400.23 |
| 6,304,531 B1 | * | 10/2001 | Koudo et al. | 369/47.23 |
| 6,445,657 B2 | * | 9/2002 | Koudo et al. | 369/47.34 |
| 7,161,757 B1 | * | 1/2007 | Krishnamoorthy et al. | 360/69 |

* cited by examiner

*Primary Examiner* — Bao Q Vu (57) ABSTRACT

In one embodiment the present invention includes a circuit comprising a switch and a switch driver. The switch is configured to provide synchronous rectification switching of a back-EMF voltage. The synchronous rectification switching produces a source voltage. The switch driver is configured to receive the back-EMF voltage and the source voltage. The switch driver provides a control signal to a control terminal of the switch. The control signal has a frequency. The frequency is used to control an amount of the synchronous rectification switching. Accordingly, the frequency reduces a dissipated power associated with the synchronous rectification switching.

18 Claims, 10 Drawing Sheets

SYSTEMS AND METHODS FOR REDUCING SPINDLE RECTIFICATION SWITCHING

CROSS REFERENCE TO RELATED APPLICATIONS

This application is a non-provisional of and claims the benefit of priority from U.S. Patent Application No. 61/019,920, filed Jan. 9, 2008, entitled "Spindle Synchronous Rectification Switching Reduction for Power Saving in Hard Disk Drives" the disclosure of which is hereby incorporated herein by reference.

BACKGROUND

The present invention relates to spindle rectification switching, and in particular, to systems and methods for reducing spindle rectification switching.

The public demand for portable devices with more functionality and extended usage times has increased the development of power conservation and power management of these devices. For example, portable music players are now being incorporated into personal media players (PMP). These players can play video as well as audio and provide a whole host of functions for the user. These functions, especially the video, may require more power and present an even greater demand on the battery. In order for a user to continue to enjoy these functions, the battery power needs to be conserved.

PMP, as other music players, use miniature hard disk drives to store large amount of data corresponding to the applications, the videos, and audio. Even miniature hard disk drives may utilize a considerable amount of power. Improvements have been made to these hard disk drives to conserve power.

Figure 1A:
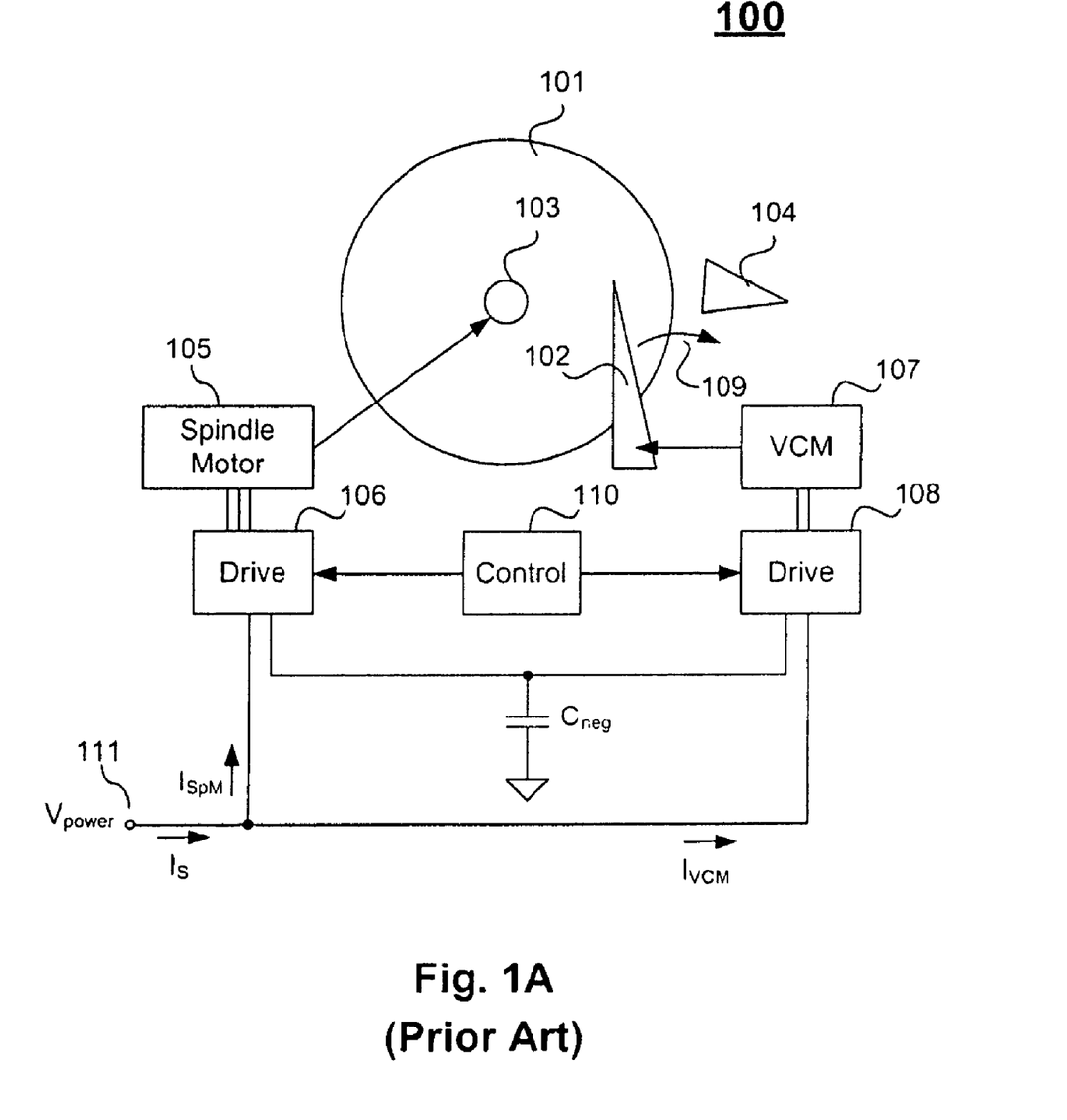
FIGS. 1A and 1B illustrate a hard disk drive system which utilizes the energy of the spinning platter to conserve power.
Figure 1B:
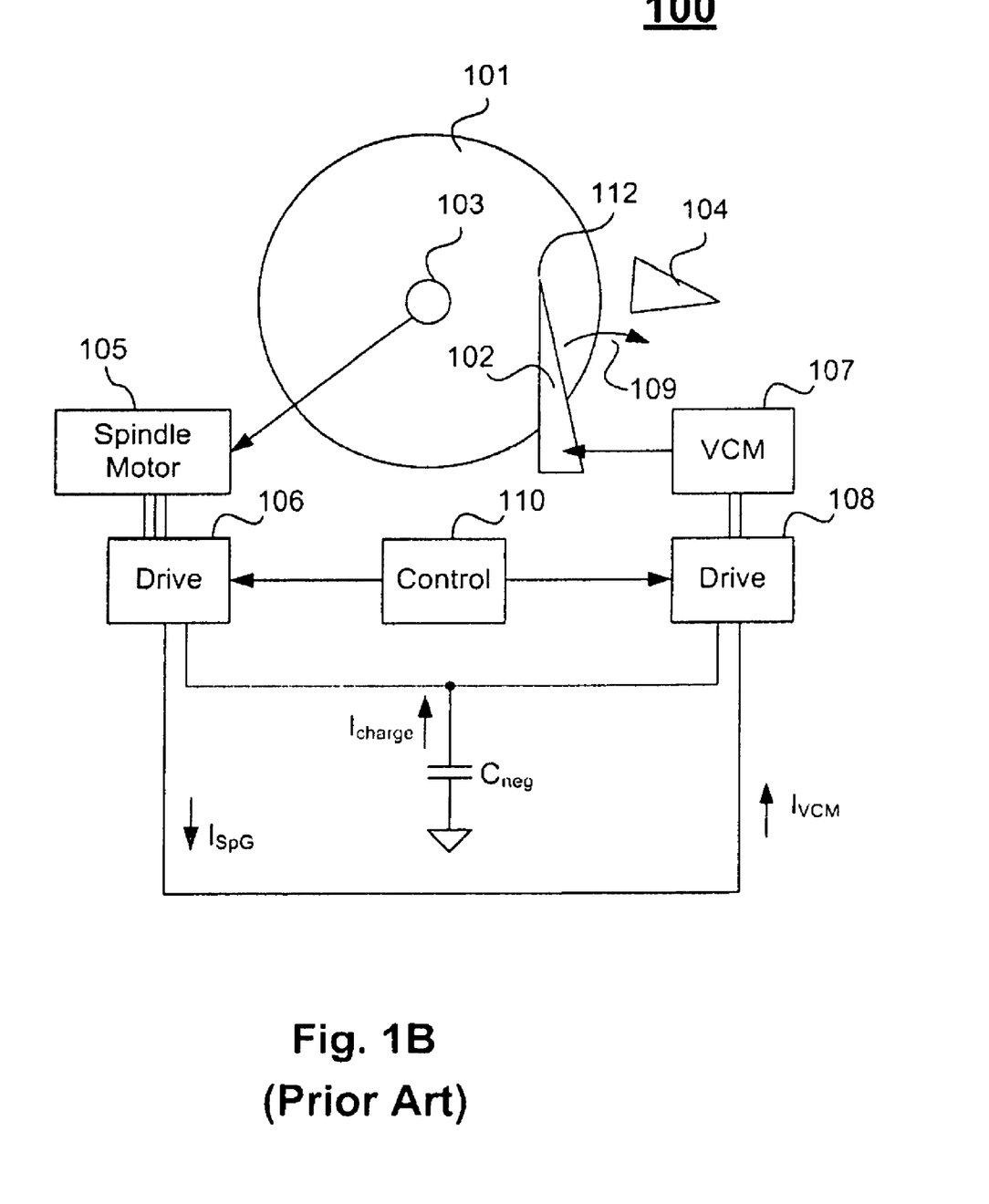

FIGS. 1A and 1B illustrate a hard disk drive system 100 which utilizes the energy of the spinning platter 101 to conserve power. FIG. 1A illustrates hard drive system 100 in normal operation. $V_{power}$ supplies current $I_S$ to hard drive system 100. Current $I_S$ includes current $I_{VCM}$ to voice coil motor (VCM) 107 through drive circuit 108 and also includes $I_{SpM}$ to spindle motor 105 through drive circuit 106. VCM 107 controls actuator arm 102 to allow access to the data on platter 101. Spindle motor 105 rotates spindle 103 and the corresponding platter 101 at a high rate of speed. Drive circuits 106 and 108 may utilize switches which may require a negative supply voltage. A capacitor $C_{neg}$ may store energy corresponding to the negative supply voltage.

During power down, spindle synchronous rectification will extract the energy from spindle 103 to perform the VCM retract operation. FIG. 1B illustrates the power distribution during the VCM retract operation. In this mode, hard drive system 100 utilizes the energy of the spinning platter 101.

Spindle motor 105 acts as a generator and provides current $I_{SpG}$ to drive VCM motor 107 to retract the actuator arm 102 in direction 109 until actuator arm 102 is parked into ramp 104. This operation allows for safely parking of head 112 of actuator arm 102. This operation conserves power by $I_{SpG}$ supplying current $I_{VCM}$ to drive circuit 108. A portion of the energy stored in the rotating platter 101 is recovered by this operation. This operation utilizes synchronous rectification switching in order to generate the supply current $I_{SpG}$.

During the synchronous rectification switching, the power dissipation due to MOS (metal oxide semiconductor) driver switching is equal to $\frac{1}{2}*CV^2*freq$. This switching during spindle rectification consumes power. Capacitor $C_{neg}$ is charged when in normal operation, but may be discharged during the spindle synchronous rectification. The size of capacitor $C_{neg}$ depends on how much power is necessary for a shutdown operation. Shutdown operations are limited to the power available during the spindle synchronous rectification and the charge available on capacitor $C_{neg}$.

Thus, it would be desirable to have improved power conservation. The present invention solves these and other problems by providing circuits and methods for, amongst other things, reducing spindle rectification switching.

SUMMARY

In one embodiment the present invention includes a circuit comprising a switch and a switch driver. The switch is configured to provide synchronous rectification switching of a back-EMF voltage. The synchronous rectification switching produces a source voltage. The switch driver is configured to receive the back-EMF voltage and the source voltage. The switch driver provides a control signal to a control terminal of the switch. The control signal has a frequency. The frequency is used to control an amount of the synchronous rectification switching. Accordingly, the Frequency reduces a dissipated power associated with the synchronous rectification switching.

In another embodiment, the switch driver includes a timer. The timer provides a delay. The delay corresponds to the frequency of the control signal.

In another embodiment, the switch driver includes a variable divider configured to receive the back-EMF voltage. The variable divider is configured to provide a signal having a varying hysteresis corresponding to the synchronous rectification switching of the switch. A portion of the varying hysteresis corresponds to the delay provided by the timer.

In one embodiment, the switch driver includes a variable divider coupled to receive the source voltage. The variable driver is coupled to provide a signal having a varying hysteresis corresponding to the synchronous rectification switching of said switch. A portion of the varying hysteresis corresponds to the delay provided by said timer.

In another embodiment, the switch driver includes a comparator configured to provide a comparison of the back-EMF voltage and the source voltage. A result of the comparison includes the varying hysteresis.

In one embodiment, the variable divider includes a plurality of switches that selectively provides a variable division of said source voltage which includes the varying hysteresis.

In another embodiment, at least one switch of the plurality of switches has a control terminal coupled to the timer such that a switching of the at least one switch includes the delay.

In one embodiment, the invention includes a circuit. The circuit includes an input terminal, a plurality of switches, a plurality of switch drivers, and a transition timing circuit. The plurality of switches is configured to provide synchronous rectification switching of three phase signals of a three phase motor acting as a generator. The synchronous rectification switching provides a switching current to the output terminal. The plurality of switch drivers is configured to switch the plurality of switches. The transition timing circuit is coupled to the plurality of switch drivers. The transition timing circuit controls the switch drivers to switch the plurality of switches to provide the synchronous rectification switching of two adjacent phase signals of the three phase signals within transition periods. Between the transition periods at least one switch of the plurality of switches remains closed such that one phase signal of the two adjacent phase signals provides a current to the output terminal. The transition periods reduce an amount of the synchronous rectification switching. Accordingly, this reduces a dissipated power associated with the synchronous rectification switching.

In another embodiment, a switch of said plurality of switches is configured to receive a back-EMF voltage, the back-EMF voltage corresponding to a phase signal of the three phase signals, the synchronous rectification switching of said switch producing a source voltage. A switch driver of the plurality of switch drivers is coupled to receive the back-EMF voltage and the source voltage. The switch driver is coupled to provide a control signal to a control terminal of the switch. The control signal has a frequency. The frequency reduces an amount of the synchronous rectification switching. Accordingly, this reduces a dissipated power associated with the synchronous rectification switching.

In one embodiment, the switch driver includes a timer. The tinier provides a delay, and the delay corresponds to the frequency of the control signal.

In another embodiment, the invention includes a system. The system includes a hard drive. The hard drive includes a circuit. The circuit includes an input terminal; a plurality of switches, a plurality of switch drivers, and a transition timing circuit. The plurality of switches is coupled to provide synchronous rectification switching of three phase signals of a three phase motor acting as a generator. The synchronous rectification switching provides a switching current to the output terminal. The plurality of switch drivers is coupled to switch the plurality of switches. The transition timing circuit is coupled to the plurality of switch drivers. The transition timing circuit controls the switch drivers to switch the plurality of switches to provide the synchronous rectification switching of two adjacent phase signals of the three phase signals within transition periods. Between the transition periods at least one switch of the plurality of switches remains closed such that one phase signal of the two adjacent phase signals provides a coupled current to the output terminal. The transition periods are used to reduce an amount of the synchronous rectification switching. Accordingly, this reduces a dissipated power associated with the synchronous rectification switching.

In one embodiment, the circuit further comprises a transition timing circuit coupled to the plurality of switch drivers. The transition timing circuit controls the switch drivers to switch said plurality of switches to provide the synchronous rectification switching of two adjacent phase signals of said three phase signals during transition periods.

In one embodiment, the invention includes a method. The method comprises providing and coupling. The providing includes providing synchronous rectification switching of three phase signals of a three phase motor acting as a generator. The synchronous rectification switching occurs within transition periods, said synchronous rectification switching providing a switching current to an output terminal. The coupling includes coupling one of two adjacent signals to the output terminal between the transition periods. The coupling provides a current to the output terminal. The transition periods reduce an amount of the synchronous rectification switching. Accordingly, this reduces a dissipated power associated with said synchronous rectification switching.

In another embodiment, the synchronous rectification switching includes receiving, generating, and coupling. The receiving includes receiving a back-EMF voltage on a first terminal of a switch. The back-EMF voltage corresponds to a phase signal of the three phase signals. The generating includes generating a control signal. The control signal has a frequency. The coupling includes coupling the control signal to a control terminal of the switch and switching the switch. The switching results in a source voltage on a second terminal of the switch. The back-EMF voltage and the source voltage are utilized in the generating of the control signal. The frequency is used to reduce an amount of the synchronous rectification switching. Accordingly, this reduces a dissipated power associated with said synchronous rectification switching.

In one embodiment, the generating includes delaying. The delaying corresponds to the frequency of the control signal.

In another embodiment, the generating includes varying a value of a variable divider configured to receive the back-EMP voltage such that a hysteresis is varied. A portion of the hysteresis corresponds to the delaying.

In one embodiment, the generating includes varying a value of a variable divider configured to receive the source voltage such that a hysteresis is varied. A portion of the hysteresis corresponds to the delaying.

In another embodiment, the generating includes comparing the back-EMF voltage and the source voltage. A result of the comparing includes the hysteresis.

In one embodiment, the varying the value of the variable divider includes switching a plurality of switches that selectively provides a variable division of the source voltage. The variable division of the source voltage includes the hysteresis.

The following detailed description and accompanying drawings provide a better understanding of the nature and advantages of the present invention.

DETAILED DESCRIPTION

Described herein are techniques for reducing spindle rectification switching. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2A:
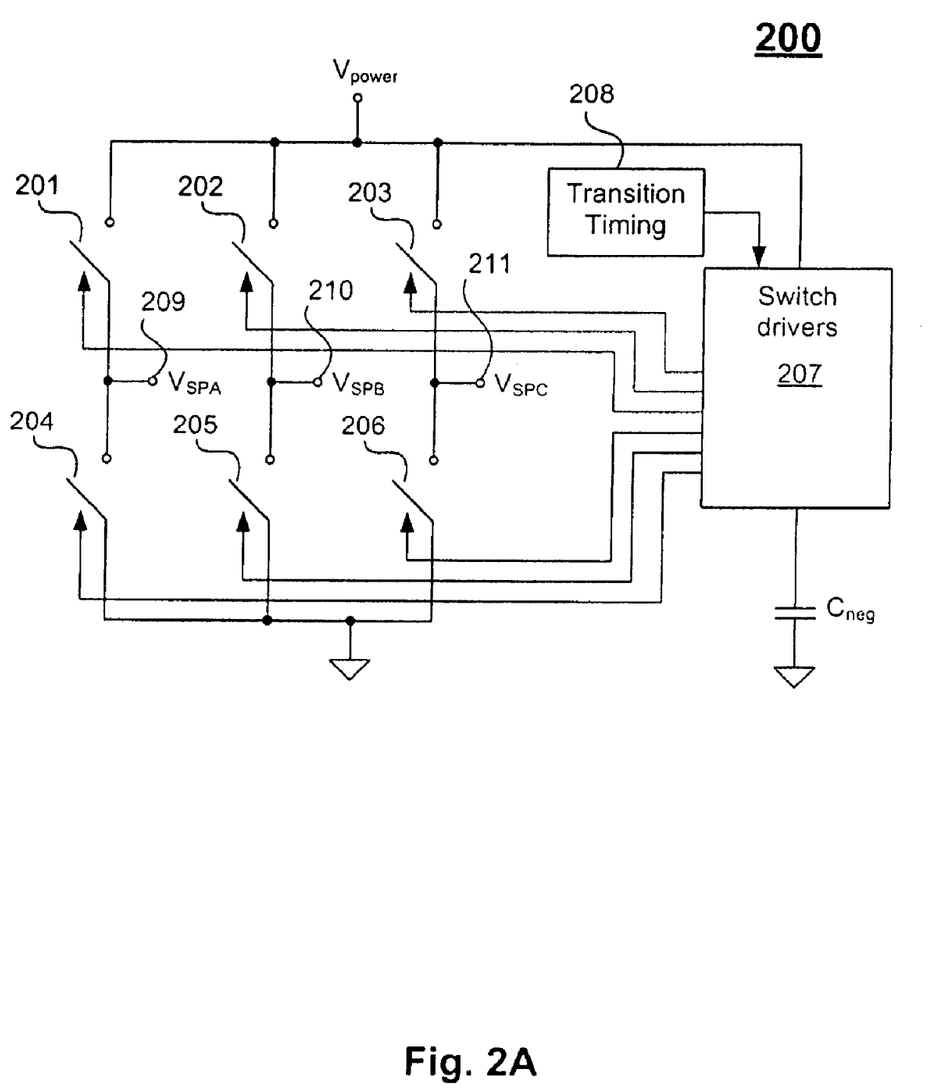
FIG. 2A illustrates a circuit according to one embodiment of the present invention.

FIG. 2A illustrates a circuit 200 according to one embodiment of the present invention. Circuit 200 may be utilized in a hard drive system, for example. A hard drive system may have a normal mode and a shutdown mode. During the normal mode, circuit 200 may be utilized to supply power to a spindle motor. During the shutdown mode, circuit 200 may perform synchronous rectification switching within restricted periods of time in order to tap as much energy of the spinning platter (e.g. platter 101 of FIG. 1B) as possible. The energy tapped by this process may be utilized to power a shutdown operation.

Circuit 200 includes switches 201-206, switch drivers 207, transition timing circuit 208, and a capacitor $C_{neg}$. $V_{power}$ is coupled to provide power to switch drivers 207. A negative supply of power may be supplied from capacitor $C_{neg}$. In a normal mode, a system (not shown) may keep capacitor $C_{neg}$ charged, and in a shutdown mode, the charge on capacitor $C_{neg}$ may be utilized by switch drivers 207 to perform synchronous rectification switching within restricted periods of time. Transition timing circuit 208 may signal switch drivers 207 when to gate the synchronous rectification switching "on" and "off." During the restricted time periods, the synchronous rectification switching is "gated on" by transition timing circuit 208.

The switch drivers 207 are coupled to control the Opening and the closing of each of the switches 201-206. The switch drivers 207 synchronously controls the switching (i.e. opening and closing) of the switches 201-206 according to the operation of the spindle motor (not shown) and provide charge to $V_{power}$. Output terminals 209-211 are coupled to the spindle motor.

Figure 2B:
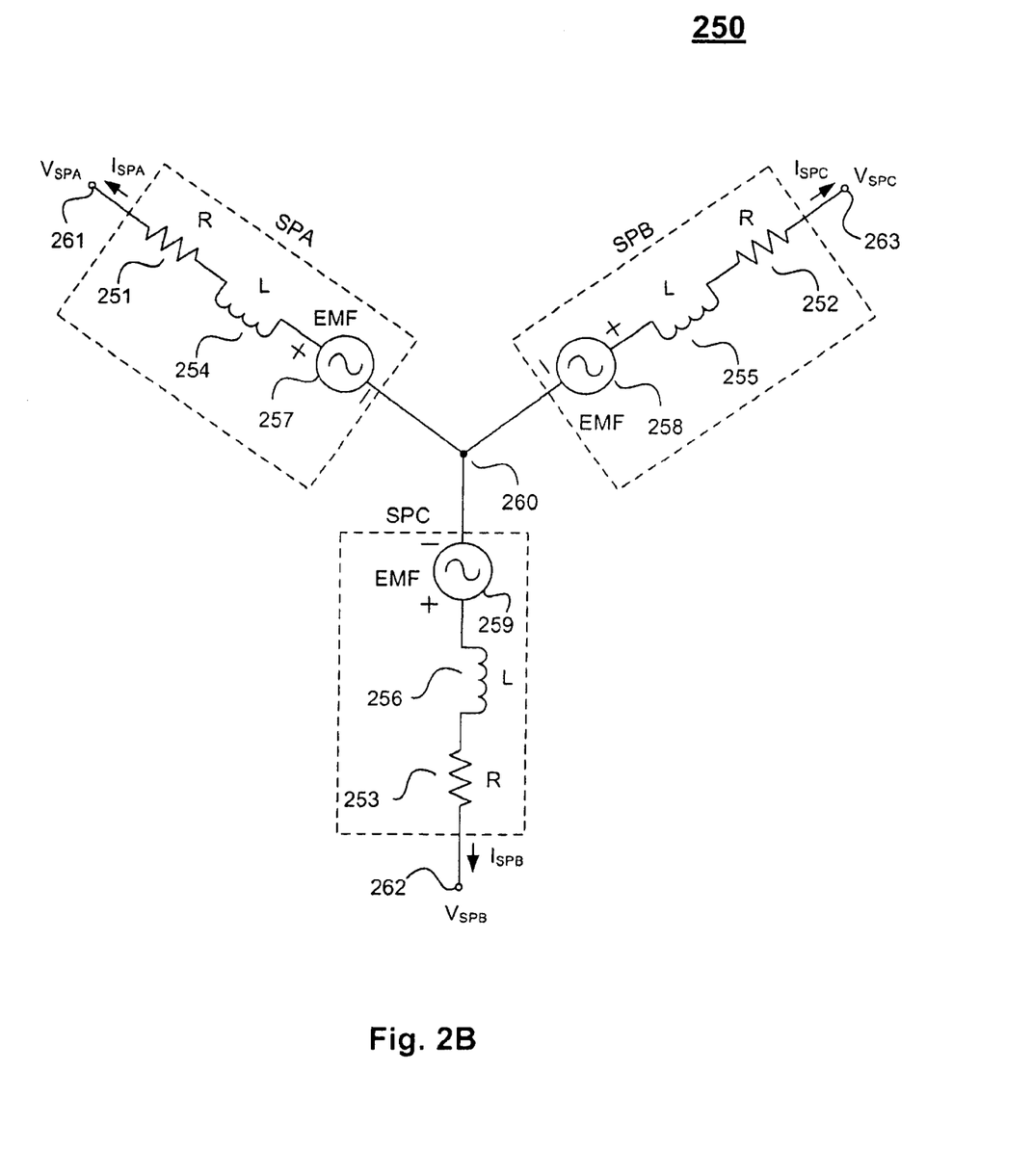
FIG. 2B illustrates a spindle motor equivalent circuit when the spindle motor is acting as a generator.

FIG. 2B illustrates a spindle motor equivalent circuit 250 when the spindle motor is acting as a generator. A spindle motor may be acting as a generator (as shown) during a shutdown sequence of a hard drive, for example. Spindle motor equivalent circuit 250 includes phase circuits SPA, SPB, and SPC. Each of the three phase circuits (i.e. SPA, SPB, and SPC) has one terminal coupled together to a common node 260 and has a corresponding output terminals 261, 262, and 263, respectively. Phase circuit SPA includes resistor 251, inductor 254, and EMF generator 257 coupled in series. Phase circuit SPB includes resistor 252, inductor 255, and electromotive force (EMF) generator 258 coupled in series. Phase circuit SPC includes resistor 253, inductor 256, and EMF generator 259 coupled in series.

The spindle motor generates back-EMF voltages $V_{SPA}$, $V_{SPB}$, and $V_{SPC}$ at output terminals 261, 262, and 263, respectively when switches 201-206 are closed and opened synchronously with the signals generated by the three phase circuits (i.e. SPA, SPB, and SPB). The switches 201-206 allow for two phase circuits to be coupled in series, and when the combination of the two phase circuits provides a positive current between any two input terminals (i.e. 261-263) the corresponding switches may be closed to charge $V_{power}$ of FIG. 2A. For example, phase circuit SPA may be coupled in series with the complement or phase circuit SPB (denoted $\overline{SPB}$). Switch drivers 207 may use timer 208 to change the state of switches 201-206 in the following order.

TABLE 1

Example Switching of Phase Circuits

State 1) $V_{SPA}$ = SPA + $\overline{SPB}$, switch 201 and 205 closed.
State 2) $V_{SPA}$ = SPA + $\overline{SPC}$, switch 201 and 206 closed.
State 3) $V_{SPB}$ = SPB + $\overline{SPC}$, switch 202 and 206 closed.
State 4) $V_{SPB}$ = SPB + $\overline{SPA}$, switch 202 and 204 closed.
State 5) $V_{SPC}$ = SPC + $\overline{SPA}$, switch 203 and 204 closed.
State 6) $V_{SPC}$ = SPC + $\overline{SPB}$, switch 203 and 205 closed.
And repeat sequence. (i.e. return to State 1 above)

Figure 2C:
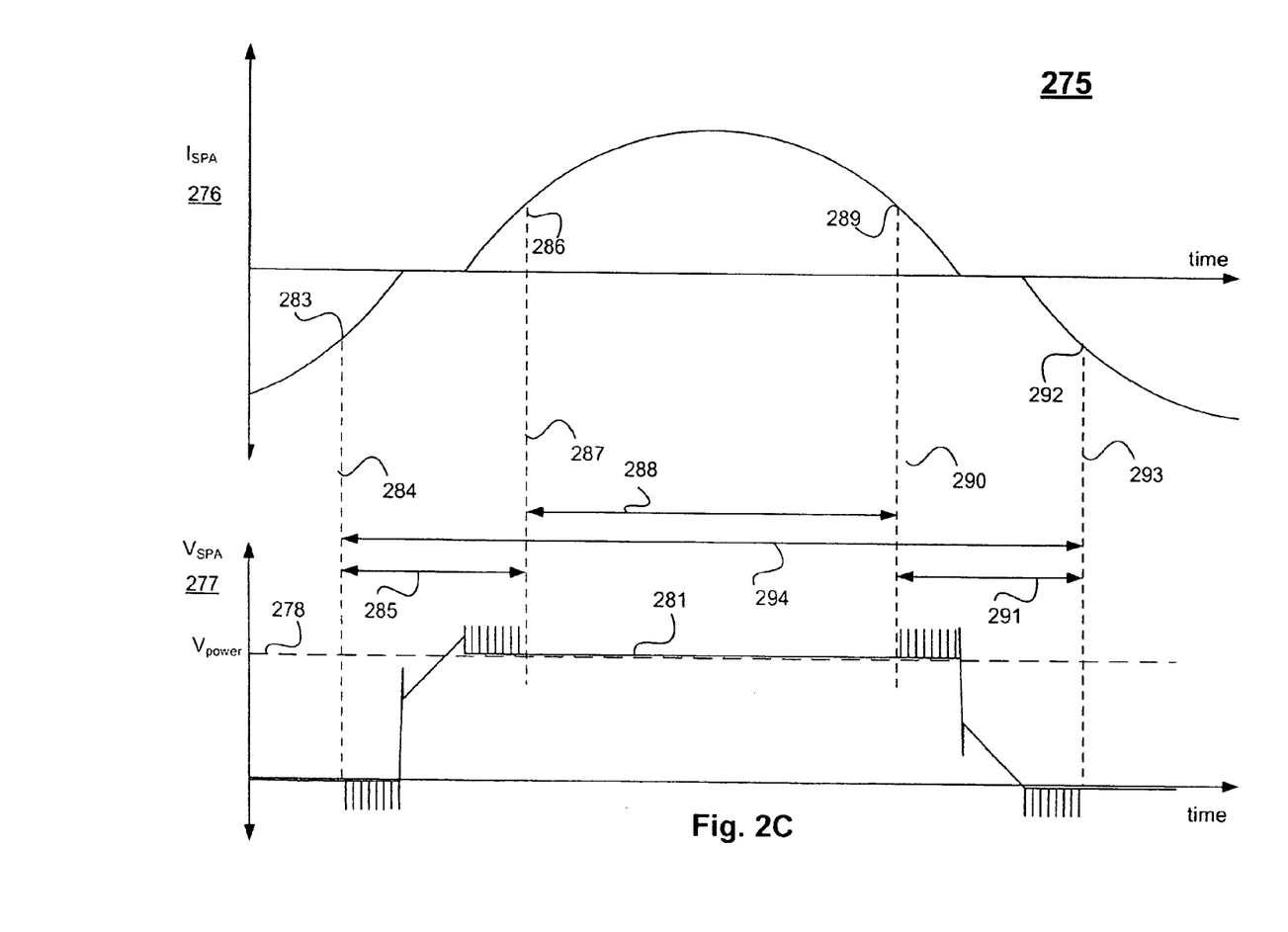
FIG. 2C illustrates a graph showing a timing of the spindle synchronous rectification for one phase of the spindle motor/generator associated with the circuit of FIG. 2A.

FIG. 2C illustrates a graph 275 showing a timing of the spindle synchronous rectification for one phase of the spindle motor/generator associated with the circuit of FIG. 2A. Graph 275 includes current waveform $I_{SPA}$ 276 and back-EMF voltage waveform $V_{SPA}$ 277. The current waveform $I_{SPA}$ 276 and back-EMF voltage waveform $V_{SPA}$ 277 are shown with clarity at the expense of exactitude Current waveform 276 corresponds to $I_{SPA}$ shown on FIG. 2B.

Graph 275 illustrates the switching of switch 201 (of circuit 200 of FIG. 2A) during a period 294. At time point 284, $I_{SPA}$ 276 has risen to point 283. There may be a threshold associated with point 283. At time point 284, $I_{SPA}$ 276 enters a first transition period 285 when synchronous rectification switching occurs for switch 201 of circuit 200 of FIG. 2A. At time point 287, $I_{SPA}$ 276 has risen to point 284. $I_{SPA}$ 276 leaves the first transition period and enters period 288. Time period 288 is when switch 201 is closed. There may be a threshold associated with point 286. Dashed line 278 represents the voltage level of $V_{power}$ of circuit 200 of FIG. 2A.

Transition period 285 represents the transition period between state 6 and state 1 for SPA of Table 1 above. During time period 288, there may be an additional transition (not shown) between state 1 and state 2 of Table 1 above. At point 290, $I_{SPA}$ 276 enter a second transition period 291 when synchronous rectification switching occurs for switches 201 of circuit 200 of FIG. 2A. At time point 290, $I_{SPA}$ 276 has fallen to point 289. There may be a threshold associated with point 289. After time point 293, $I_{SPA}$ 276 has fallen to point 292 which may be associated with a threshold. At time point 293, $I_{SPA}$ 278 leaves the second transition period 291. After time point 293 switch 201 is open. Transition period 291 represents the transition between state 2 and state 3 for SPA of Table 1 above.

Utilizing the synchronous rectification switching during transition periods (e.g. 285 and 291) reduces the amount of switching. The more accurately the transition times may be determined the smaller the transition periods may be designed. The reduction of switching may reduce the amount of power dissipated within the switch. For example, if switch 201-206 are MOS (Metal Oxide Semiconductor) power switches, they may have a significant gate capacitance to charge. Charging and discharging this gate capacitance during switching takes power from switch driver 207 (of circuit 200 of FIG. 2A). Reducing the time period of switching to transition periods reduces switching. The reduction of switching time reduces power dissipated due to switching. The reduction of power consumption may provide additional power for a more comprehensive shutdown operation. Alternately, the reduction of power consumption may utilize a small value of Cneg, and in this case save die area on an integrated embodiment of the invention.

Figure 3A:
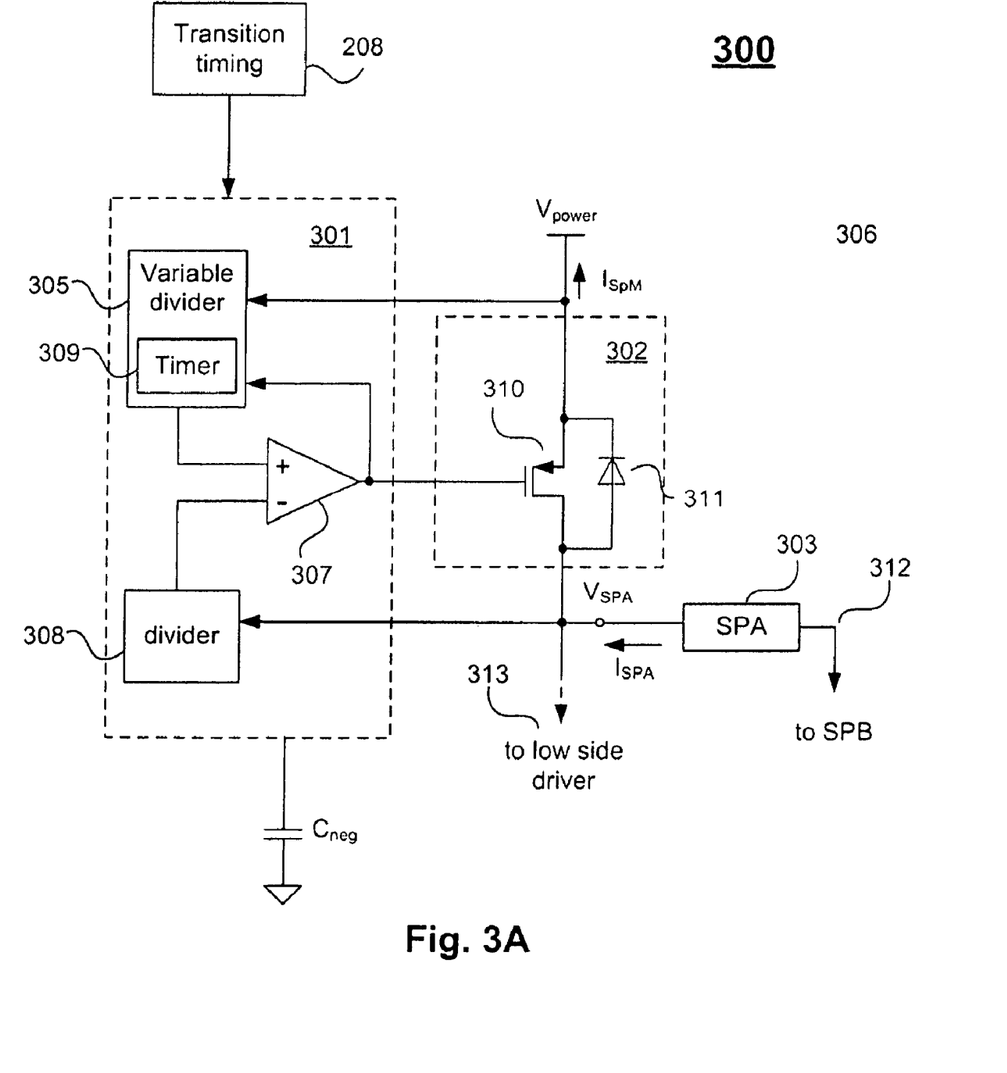
FIG. 3A illustrates a circuit according to another embodiment of the present invention.

FIG. 3A illustrates a circuit 300 according to another embodiment of the present invention. Circuit 300 includes a switch driver 301, a switch 302, a phase circuit SPA 303, a transition timing circuit 208, and a capacitor $C_{neg}$.

Circuit 300 is a portion of a circuit which may be similar to circuit 200 shown in FIG. 2A. Switch 302 is similar to switch 201 of FIG. 2A. Point 313 may connect to a low side switch functioning similarly to switch 204 of FIG. 2A. Switch driver 301 may have similar circuitry to switch drivers 207 of FIG. 2A. SPA is similar to phase circuit SPA of spindle motor equivalent circuit 250 of FIG. 2B. Common node 312 corresponds to common node 260 of FIG. 2B.

Transition timing circuit 208 may control whether circuit 300 is operating in a transition period similar to transition periods 285 and 291 of FIG. 2C. Transition timing circuit 208 may also control whether the corresponding switch 302 is operating in a time period similar to time period 288 of FIG. 2C. During this time period, switch 302 may be closed and coupling $I_{SPA}$ to $V_{power}$.

Switch 302 is coupled to provide synchronous rectification switching of a back-EMF voltage $V_{SPA}$. The synchronous rectification switching may occur during a transition period similar to transition period 285 of FIG. 2C. Switch 302 includes a transistor 310 in parallel with a diode 311. Circuit 300 may be part of an integrated circuit and diode 311 may be a body diode of a PMOS transistor 310. Transistor 310 may be a power transistor with a gate terminal having a gate capacitance. Switch drivers 301 alternately charges/discharges this gate in order to turn switch 302 "off"/"on". The synchronous rectification switching produces a source voltage $V_{power}$.

Switch drivers 301 includes a variable divider 305, a divider 308, and a comparator 307. Variable divider 305 may include a timer 309. Divider 308 is coupled to receive the back-EMF voltage $V_{SPA}$ and variable divider 305 is coupled to receive the source voltage $V_{power}$. Comparator 307 is also coupled to provide a control signal to a control terminal of switch 302. The control signal includes a varying hysteresis of the synchronous rectification switching.

Divider 308 divides the back-EMF voltage $V_{SPA}$, and variable divider 305 varies a voltage division of according to the varying hysteresis. For example, divider 308 may divide back-EMF voltages $V_{SPA}$ by one half, $V_{power}$ may be 0.6V, and the variable divider 305 may divide $V_{power}$ by 1.714. The divided signals are coupled to comparator 307, and comparator 307 will switch states on its output terminal when its input terminals pass a threshold in which they are equal.

TABLE 2

Example Equations to determine hysteresis levels $V_{SPA}$/(divider) = $V_{power}$/(variable divider)
$V_{SPA}$/(2) = (0.6)/(1.714)
$V_{SPA}$ = approximately 0.7 V
$V_{SPA}$ − $V_{power}$ = hysteresis
0.7 − 0.6 = +100 mV Varying the value of the variable divider 305 varies the hysteresis of the switch drivers 301. The variable divider 305 may vary a value of division by adding or removing elements from the divider 308. These elements may be resistors which are removed or added from the circuit by selectively opening and closing switches. In this case the variable divider 305 is 1.714 which produces approximately 100 mV of hysteresis. In this embodiment, comparator 307 provides the control signal to the control terminal of transistor 310.

Figure 3B:
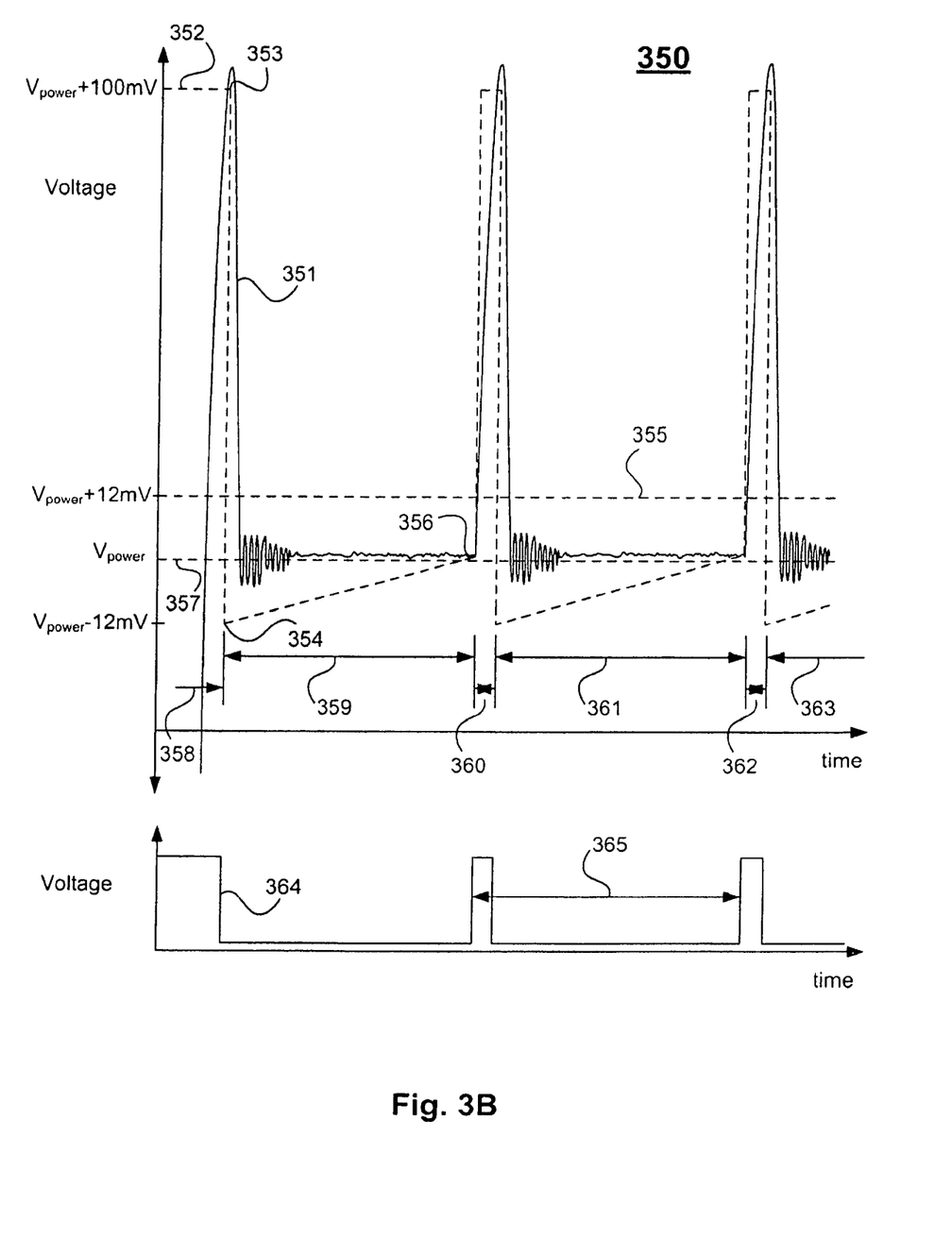
FIG. 3B illustrates a graph depicting waveforms associated the circuit of FIG. 3A.

FIG. 3B illustrates a graph depicting waveforms associated the circuit of FIG. 3A. Graph 350 includes a back-EMF voltage waveform $V_{SPA}$ 351, a control signal waveform 364, and a varying hysteresis waveform 352. Up to the end of time period 358, the hysteresis is at 100 mV above $V_{power}$ 357. Variable divider 305 incorporates the 100 mV in the value of division as described above. At this time, current $I_{SPA}$ is increasing and passing through diode 311 since transistor 310 is off. At point 353, switch drivers 301 responds to the 100 mV hysteresis and comparator 307 to a low state which turns transistor 310 "on". The hysteresis is also set to −12 mV hysteresis. $V_{SPA}$ waveform 351 settles around a voltage a little greater than $V_{power}$ 357 due to the $R_{DSON}$ of transistor 310.

At point 354, timer 309 begins to ramp the hysteresis level for period 359. At point 356, the hysteresis waveform 352 passes $V_{SPA}$ waveform 351 and comparator 307 switches states such that transistor 310 is switched to an "off" state. The hysteresis waveform 352 returns to 100 mV hysteresis. Since the SPA has an inductance, the current must remain continuous and therefore at point 356, $V_{SPA}$ waveform 351 rises quickly. Once again, $V_{SPA}$ waveform 351 rises as current $I_{SPA}$ is increasing and passing through diode 311. And again the cycle of switching switch 302 continues.

A period 365 includes a time period 360 for $V_{SPA}$ waveform 351 to rise to 100 mV and return, but time period 361 makes up the majority of period 365. Period 365 corresponds to a frequency of synchronous rectification switching. The frequency may be changed by changing the timer 309 of circuit 300. The larger the time period 361 implemented in timer 309, the lower the frequency of switching. Control signal 364 has this frequency. The frequency reduces the synchronous rectification switching.

Figure 4A:
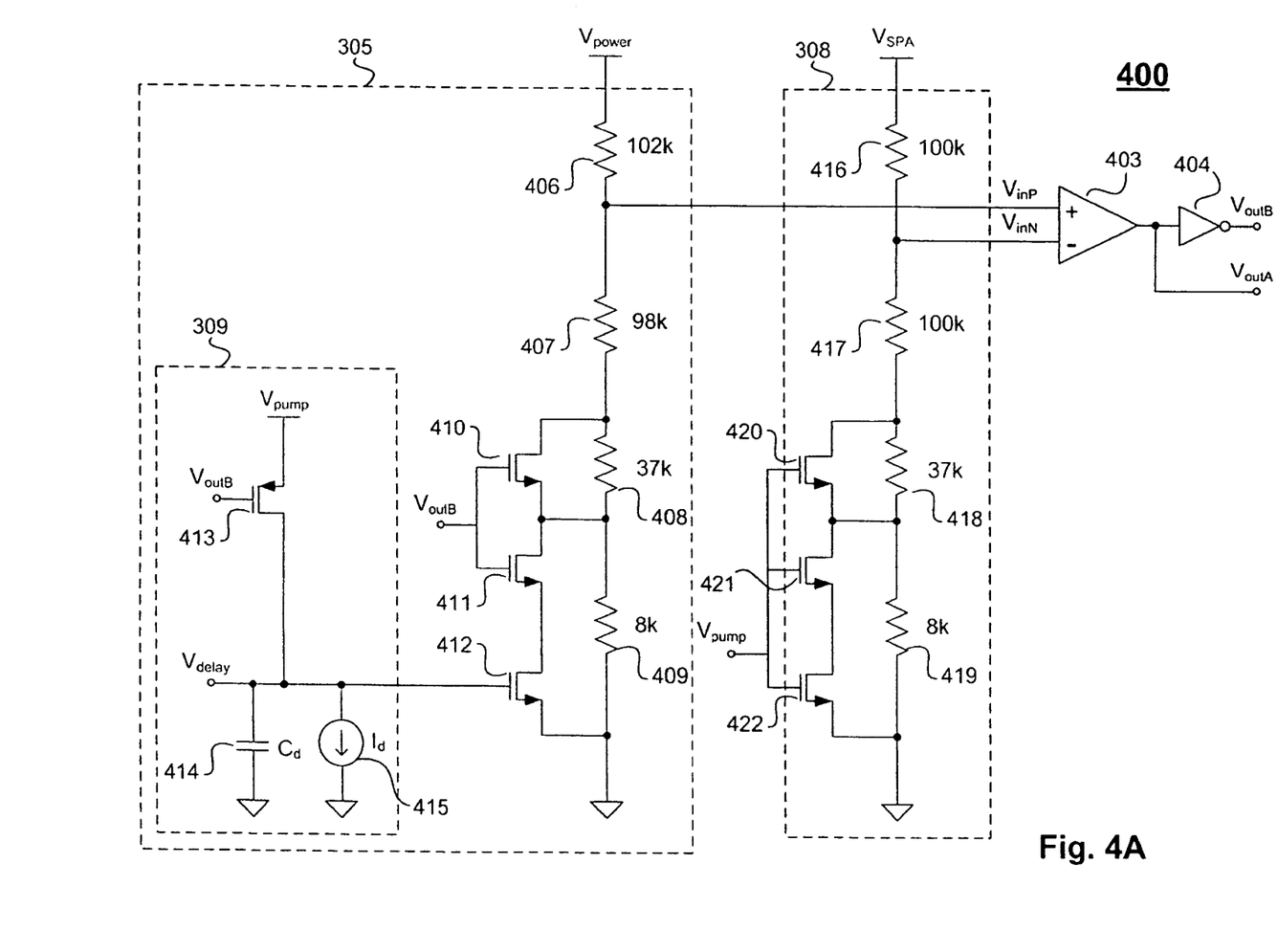
FIG. 4A illustrates a switch drivers according to one embodiment of the present invention.

FIG. 4A illustrates a switch drivers 400 according to one embodiment of the present invention. FIG. 4A illustrates a switch drivers 400 for one (i.e. SPA) of the three phase circuits (i.e. SPA, SPB and SPC) associated with a three phase spindle motor operating as a generator. There may be similar switch drive circuits which drive the other phase circuits as well (i.e. SPB and SPC). Circuit 400 includes a variable divider 305, a divider 308, a comparator 403, and an inverter 404. Variable divider 305 may also contain timer 309. Switch drivers 400 provides variable hysteresis corresponding to a timing provided by timer 309.

Variable divider 305 includes timer 309, resistors 406-409 coupled in series, and transistors 410-412. One terminal of resistor 406 is coupled to $V_{power}$ and a second terminal of resistor 406 is coupled to one input terminal of comparator 403 and to one terminal of resistor 407. Transistor 410 has one terminal coupled to a second terminal of resistor 407 and a first terminal of resistor 408. A second terminal of resistor 408 is coupled to a second terminal of transistor 410 and a first terminal of transistor 411 and a first terminal of resistor 409. A second terminal of resistor 409 is coupled to a reference voltage. This reference voltage is ground in this embodiment. A second terminal of transistor 411 is coupled to a first terminal of transistor 412. A second terminal of transistor 412 is coupled to the second terminal of resistor 409. A control terminal of transistor 410 and 411 are coupled to $V_{outB}$, the output terminal of inverter 404. A control terminal of transistor 412 is coupled to an output of timer 309.

Divider 308 includes resistors 416-419 coupled in series, and transistors 420-422. One terminal of resistor 416 is coupled to back-EMF voltage $V_{SPA}$ and a second terminal of resistor 416 is coupled to one input terminal of comparator 403 and to one terminal of resistor 417. Transistor 420 has one terminal coupled to a second terminal of resistor 417 and a first terminal of resistor 418. A second terminal of resistor 418 is coupled to a second terminal of transistor 420 and a first terminal of transistor 421 and a first terminal of resistor 419. A second terminal of resistor 419 is coupled to a reference voltage. This reference voltage is ground in this embodiment. A second terminal of transistor 421 is coupled to a first terminal of transistor 422. A second terminal of transistor 422 is coupled to the second terminal of resistor 419. A control terminal of transistor 420, 421, and 422 are coupled to reference voltage Vpump. Transistors 420-422 are "on" and are included so that a parallel resistance which includes resistances 418-419 and transistors 420-422 match the parallel resistance of resistors 408-409 and transistors 410-412 when transistor 410-412 are "on".

Timer 309 includes transistor 413, capacitor 414, and current source 415. Capacitor 414 has a first terminal coupled to a first terminal of current source 415, the control terminal of transistor 412, and a first terminal of transistor 413. A second terminal of capacitor 414 and current source 415 are couple to ground. A second terminal of transistor 413 is coupled to reference voltage $V_{pump}$. A control terminal of transistor 413 is coupled to $V_{outB}$, the output terminal of inverter 404. The input terminal of inverter 404 is coupled to the output terminal of comparator 403.

At an initial point similar to the beginning of the transition period 285 of FIG. 2C, the hysteresis is at 100 mV. The calculation is similar to Table 2: Example Equations to determine hysteresis levels. $V_{outB}$ is at low voltage, in this embodiment, at this time. This low voltage turns "on" transistor 413 and makes $V_{delay}$ become approximately $V_{pump}$. This turns "on" transistor 412.

When back-EMF voltage $V_{SPA}$ passes the 100 mV hysteresis level, comparator 403 goes to a low level. The output of comparator 403 is coupled to inverter 404, and the output of inverter 404 goes to a high level. This change of state of the $V_{outB}$ turns "off" transistor 413 and allows current source 415 to begin to discharge capacitor 414 and reduce $V_{delay}$. $V_{outB}$ going high also changes the hysteresis to −12 mV by turning "on" transistor 410 and 411 and effectively shorting out resistors 408 and 409 (i.e. removing resistive elements). The changing of the divider changes the hysteresis level.

As capacitor 414 is discharged, $V_{delay}$ decays. For a portion of time transistor 412 will remain "on" and effectively short resistor 409. However, as $V_{delay}$ decreases past a threshold, transistor 412 will enter a resistive region and form a parallel resistance with resistor 409. This will vary the hysteresis from −12 mV toward +12 mV. At one point the hysteresis level will pass the back-EMF voltage $V_{SPA}$ level and comparator 403 and inverter 404 will change states so the $V_{outB}$ changes to a low level. Consequently, the hysteresis changes to 100 mV, the $V_{delay}$ voltage is reset to approximately $V_{pump}$, and a switch (not shown) turns "off" so that current across its body diode begins to increase back-EMF voltage $V_{SPA}$ once again. Back-EMF voltage $V_{SPA}$ crosses the 100 mV hysteresis level and the cycle begins again.

Figure 4B:
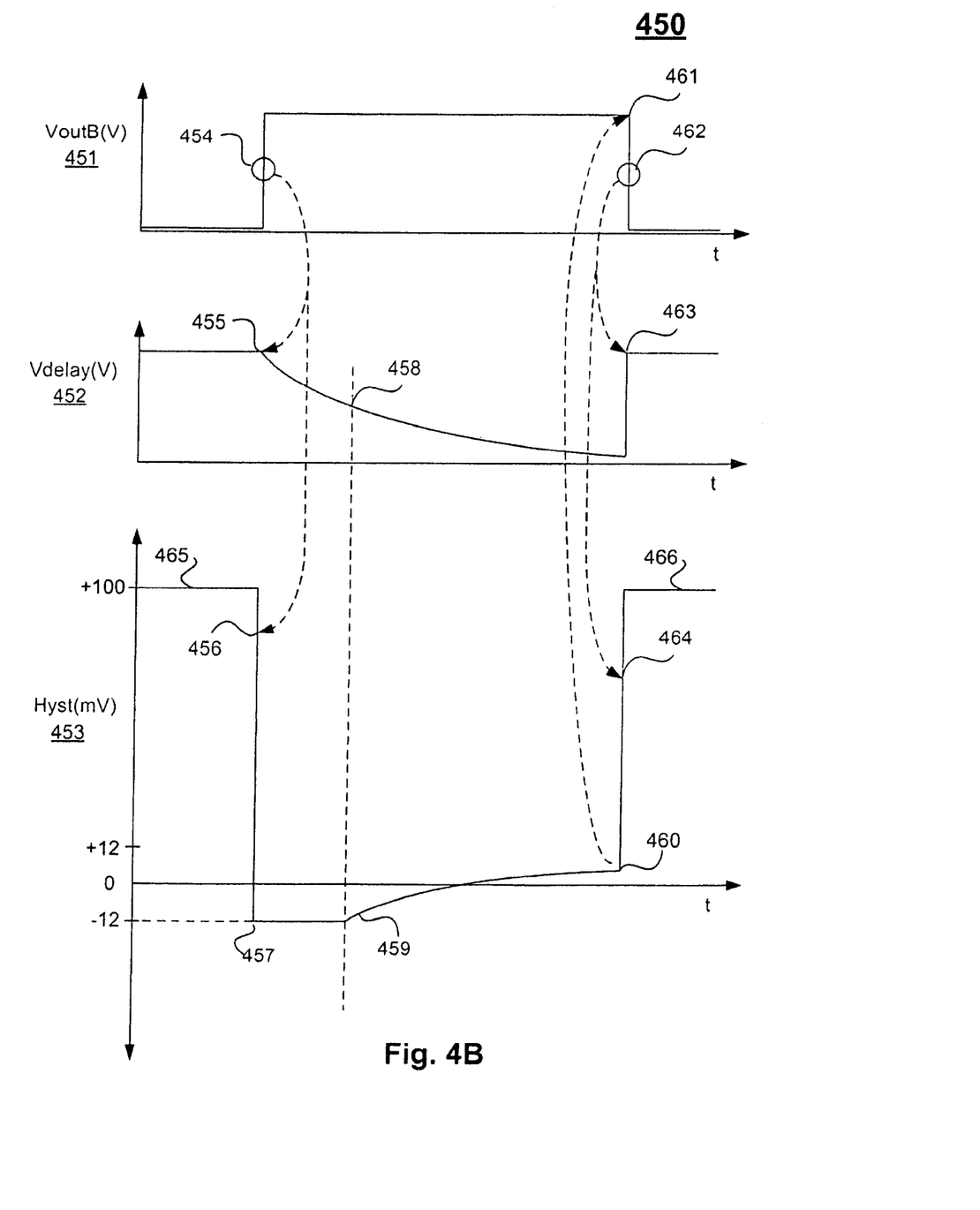
FIG. 4B illustrates a timing diagram showing the relationship of signals associated with the switch drivers of FIG. 4A.

FIG. 4B illustrates a timing diagram 450 showing the relationship of signals associated with switch drivers 400 of FIG. 4A. Timing diagram 450 includes a $V_{outB}$ waveform 451, a $V_{delay}$ waveform 452, and a hysteresis waveform 453. The hysteresis waveform 453 is initially at 100 mV at point 465.

When back-EMF voltage $V_{SPA}$ exceeds the 100 mV hysteresis level, the $V_{outB}$ waveform 451 provides a changing state 454. Changing state 454 triggers the hysteresis to be changed to −12 mv at 457 and triggers the $V_{delay}$ voltage to begin discharging at 455. Up to time point 458 the hysteresis remains at −12 mV, but after time point 458 the hysteresis may rise 459 as transistor 412 of FIG. 4 begins to turn off as described above.

At point 460, the hysteresis may have passed back-EMF voltage $V_{SPA}$. Point 460 may be between 0 and 12 mV of hysteresis. When the hysteresis passes back-EMF voltage $V_{SPA}$, $V_{outB}$ waveform 451 changes state 462 from a high level 461 to a low level. State change 462 resets $V_{delay}$ waveform to approximately $V_{pump}$ at 463 and changes 464 the hysteresis waveform 453 to the 100 mv hysteresis level 466.

Figure 4C:
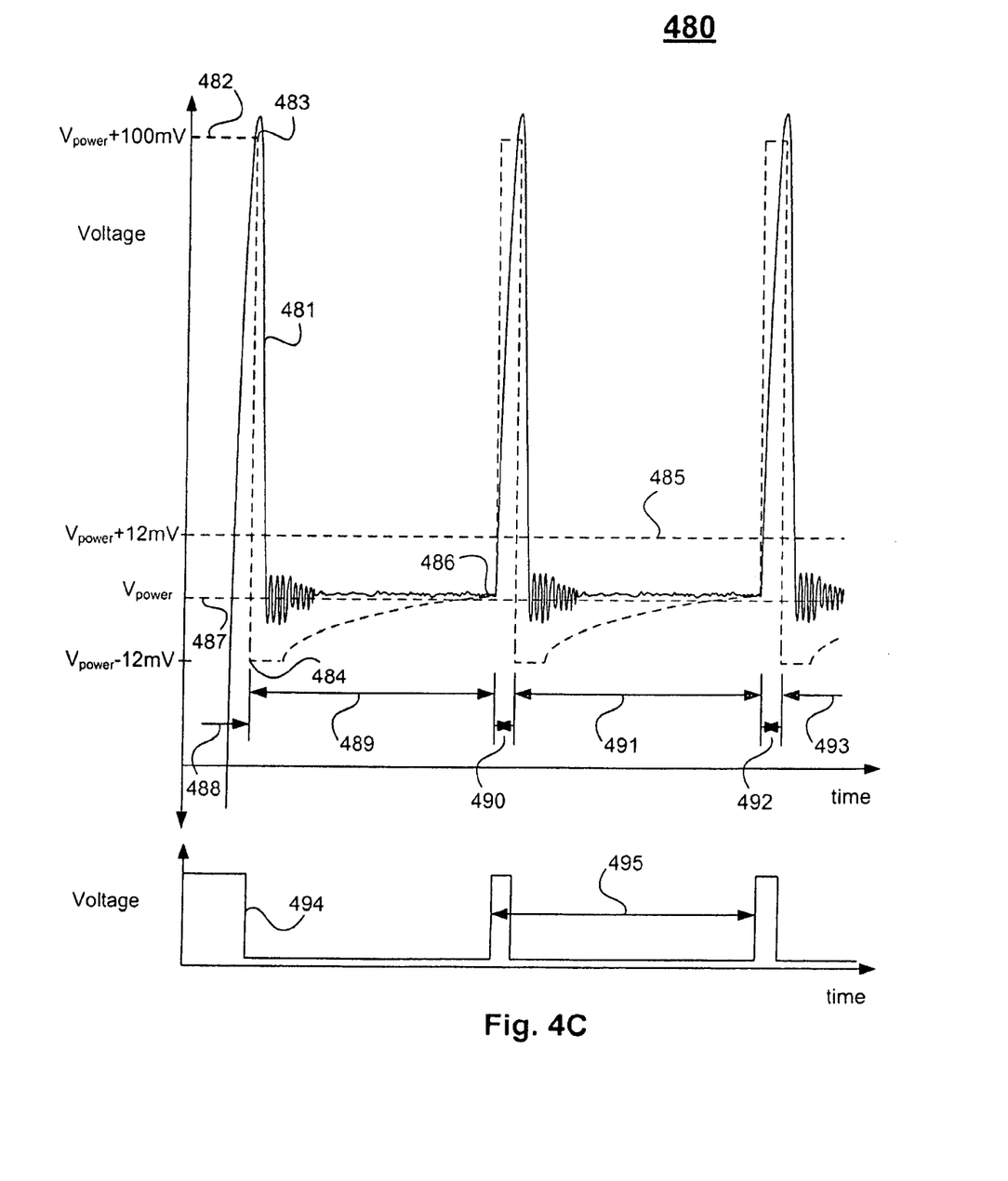
FIG. 4C illustrates a graph depicting waveforms associated the switch drivers of FIG. 4A.

FIG. 4C illustrates a graph 480 depicting waveforms associated the switch drivers 400 of FIG. 4A. Graph 480 is similar to graph 350 of FIG. 3B. Graph 480 includes a back-EMF voltage waveform $V_{SPA}$ 481, a control signal waveform 494, and a varying hysteresis waveform 482. Up to the end of time period 488, the hysteresis is at 100 mV above $V_{power}$ 487. Variable divider 305 (of switch drivers 400 of FIG. 4A) incorporates the 100 mV in the value of division as described above. At this time, current $I_{SPA}$ is increasing and control signal waveform 494 is high so that a corresponding switch is "off" and current $I_{SPA}$ is passing through a corresponding diode as described above. At point 483, switch drivers 400 responds to the 100 mV hysteresis and comparator 403 changes state to a low state. The hysteresis is also set to −12 mV hysteresis at point 484. $V_{SPA}$ waveform 481 may settle around a voltage a little greater than $V_{power}$ 487 due to the $R_{DSON}$ of a corresponding transistor acting as a switch.

At point 484, timer 309 begins to discharge capacitor 414. At first the hysteresis remains constant, but as transistor 412 begins to turn "on", the hysteresis waveform 482 begins to increase toward +12 mV at portion 486. The control signal waveform 494 remains low for a period 489. At point 486, the hysteresis waveform 482 passes $V_{SPA}$ waveform 481 and comparator 403 switches states. The hysteresis waveform 482 returns to 100 mV hysteresis. Since the SPA has an inductance, the current must remain continuous and therefore at point 486, $V_{SPA}$ waveform 481 rises quickly. Once again, $V_{SPA}$ waveform 481 rises as current $I_{SPA}$ is increasing and passing through a corresponding diode (not shown). And again the cycle of synchronous rectification switching continues.

A period 495 includes time period 490 and 491. Time period 491 corresponds to the delay created by timer 309 and makes up the majority of period 495. Period 495 corresponds to a frequency of synchronous rectification switching. The frequency may be changed by changing the timer 309 of circuit 400 of FIG. 4. The value $C_d$ of capacitor 414 and/or the value of current $I_d$ of current source 415 may contribute to determining the frequency. The larger the time period 491 implemented in timer 309, the lower the frequency of switching. Control signal 494 has this frequency. The frequency reduces the synchronous rectification switching.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A circuit comprising:
    a switch configured to provide synchronous rectification switching of a back-EMF voltage, the synchronous rectification switching producing a source voltage; and
    a switch driver configured to receive the back-EMF voltage and the source voltage and to provide a control signal to a control terminal of said switch, the control signal having a frequency,
    wherein the frequency reduces an amount of said synchronous rectification switching thereby reducing a dissipated power associated with said synchronous rectification switching.

2. The circuit of claim 1 wherein the switch driver includes a timer,
    wherein the timer provides a delay, the delay corresponding to the frequency of said control signal.

3. The circuit of claim 2 wherein the switch driver includes a variable divider configured to receive the back-EMF voltage,
    wherein said variable divider is configured to provide a signal including a varying hysteresis corresponding to the synchronous rectification switching of said switch,
    wherein a portion of the varying hysteresis corresponds to the delay provided by said timer.

4. The circuit of claim 2 wherein the switch driver includes a variable divider configured to receive the source voltage,
wherein said variable divider is configured to provide a signal including a varying hysteresis corresponding to the synchronous rectification switching of said switch,
wherein a portion of the varying hysteresis corresponds to the delay provided by said timer.

5. The circuit of claim 4 wherein the switch driver includes a comparator configured to provide a comparison of the back-EMF voltage and the source voltage,
wherein a result of the comparison includes the varying hysteresis.

6. The circuit of claim 4 wherein the variable divider includes a plurality of switches that selectively provides a variable division of said source voltage,
wherein the variable division includes the varying hysteresis.

7. The circuit of claim 6 wherein at least one switch of the plurality of switches has a control terminal coupled to the timer such that a switching of the at least one switch includes the delay.

8. A circuit comprising:
an output terminal;
a plurality of switches configured to provide synchronous rectification switching of three phase signals of a three phase motor acting as a generator, said synchronous rectification switching providing a switching current to said output terminal;
a plurality of switch drivers configured to switch said plurality of switches; and
a transition timing circuit coupled to the plurality of switch drivers,
wherein said transition timing circuit controls the switch drivers to switch said plurality of switches to provide said synchronous rectification switching of two adjacent phase signals of said three phase signals within transition periods,
wherein between said transition periods at least one switch of said plurality of switches remains closed such that one phase signal of said two adjacent phase signals provides a current to the output terminal, and
wherein the transition periods are used to reduce an amount of said synchronous rectification switching thereby reducing a dissipated power associated with said synchronous rectification switching.

9. The circuit of claim 8 wherein a switch of said plurality of switches is configured to receive a back-EMF voltage, the back-EMF voltage corresponding to a phase signal of the three phase signals, the synchronous rectification switching of said switch producing a source voltage,
wherein a switch driver of said plurality of switch drivers is configured to receive the back-EMF voltage and the source voltage and provide a control signal to a control terminal of said switch, the control signal having a frequency,
wherein the frequency is used to control an amount of said synchronous rectification switching thereby reducing the dissipated power associated with said synchronous rectification switching.

10. The circuit of claim 9 wherein the switch driver includes a timer,
wherein the timer provides a delay, the delay corresponding to the frequency of said control signal.

11. The circuit of claim 8 further comprising
a transition timing circuit coupled to the plurality of switch drivers,
wherein said transition timing circuit controls the switch drivers to switch said plurality of switches to provide said synchronous rectification switching of two adjacent phase signals of said three phase signals during transition periods.

12. A method comprising:
providing synchronous rectification switching of three phase signals of a three phase motor acting as a generator, said synchronous rectification switching occurring within transition periods, said synchronous rectification switching providing a switching current to an output terminal; and
coupling one of two adjacent signals to the output terminal between said transition periods, said coupling providing a current to the output terminal,
wherein the transition periods are used to reduce an amount of said synchronous rectification switching thereby reducing a dissipated power associated with said synchronous rectification switching.

13. The method of claim 12 wherein the synchronous rectification switching includes
receiving a back-EMF voltage on a first terminal of a switch, the back-EMF voltage corresponding to a phase signal of the three phase signals,
generating a control signal, the control signal having a frequency, and
coupling the control signal to a control terminal of said switch and thereby switching said switch, the switching resulting in a source voltage on a second terminal of said switch,
wherein the back-EMF voltage and the source voltage are utilized in the generating of the control signal,
wherein the frequency is used to control an amount of the synchronous rectification switching, and in accordance therewith, reduces a dissipated power associated with said synchronous rectification switching.

14. The method of claim 13 wherein the generating includes delaying,
wherein the delaying corresponds to the frequency of said control signal.

15. The method of claim 14 wherein the generating includes varying a value of a variable divider configured to receive the back-EMF voltage such that a hysteresis is varied,
wherein a portion of the hysteresis corresponds to the delaying.

16. The method of claim 14 wherein the generating includes varying a value of a variable divider configured to receive the source voltage such that a hysteresis is varied,
wherein a portion of the hysteresis corresponds to the delaying.

17. The method of claim 16 wherein the generating includes comparing the back-EMF voltage and the source voltage,
wherein a result of the comparing includes the hysteresis.

18. The method of claim 16 wherein the varying the value of the variable divider includes switching a plurality of switches that selectively provides a variable division of said source voltage,
wherein the variable division includes the hysteresis.

* * * * *